United States Patent
Guernsey

(10) Patent No.: US 11,305,978 B2
(45) Date of Patent: Apr. 19, 2022

(54) MODULAR PLURAL COMPONENT PLATFORM

(71) Applicant: Carlisle Fluid Technologies, Inc., Scottsdale, AZ (US)

(72) Inventor: Jonathan Jean Guernsey, Temperance, MI (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 0 days.

(21) Appl. No.: 16/534,867

(22) Filed: Aug. 7, 2019

(65) Prior Publication Data

US 2020/0048067 A1 Feb. 13, 2020

Related U.S. Application Data

(60) Provisional application No. 62/718,219, filed on Aug. 13, 2018.

(51) Int. Cl.
| | |
|---|---|
| *B67D 3/00* | (2006.01) |
| *G06F 9/48* | (2006.01) |
| *G05D 7/06* | (2006.01) |
| *B01F 3/08* | (2006.01) |
| *B01F 15/00* | (2006.01) |
| *B01F 15/02* | (2006.01) |
| *B01F 23/40* | (2022.01) |
| *B01F 35/21* | (2022.01) |
| *B01F 35/22* | (2022.01) |
| *B01F 35/71* | (2022.01) |

(52) U.S. Cl.
CPC .......... *B67D 3/0012* (2013.01); *B01F 23/405* (2022.01); *B01F 35/2111* (2022.01); *B01F 35/2209* (2022.01); *B01F 35/7176* (2022.01); *G05D 7/0635* (2013.01); *G05D 7/0676* (2013.01); *G06F 9/48* (2013.01)

(58) Field of Classification Search
CPC ....... B67D 3/0012; G06F 9/48; G06F 9/4411; G06F 9/4413; G05D 7/0635; G05D 7/0676; B01F 15/00253; B01F 3/0803; B01F 15/00136; B01F 15/0243; G05B 19/0426
See application file for complete search history.

(56) References Cited

U.S. PATENT DOCUMENTS

| | | |
|---|---|---|
| 5,056,034 A | 10/1991 | Rucki et al. |
| 6,393,341 B1 * | 5/2002 | Lawrence ................. G06F 9/54 700/286 |
| 7,023,337 B2 | 4/2006 | Whitmore et al. |
| 7,024,285 B2 | 4/2006 | Saelens |

(Continued)

OTHER PUBLICATIONS

PCT International Search Report & Written Opinion for PCT Application No. PCT/US2019/046224 dated Nov. 19, 2019, 11 pgs.

*Primary Examiner* — Charles R Kasenge
(74) *Attorney, Agent, or Firm* — Peter J. Beardsley

(57) ABSTRACT

A method includes receiving, via a processor, a unit configuration for a fluid mixing and dispensing system, where the unit configuration includes one or more fluid hardware components. The method also includes determining one or more software modules corresponding to the one or more fluid hardware components and configuring a modular plural component platform by loading the one or more software modules corresponding to the one or more fluid hardware components.

17 Claims, 8 Drawing Sheets

(56) References Cited

U.S. PATENT DOCUMENTS

| | | | |
|---|---|---|---|
| 7,516,641 B2* | 4/2009 | Lewis | G01F 25/0007 73/1.16 |
| 8,288,976 B2* | 10/2012 | Jeung | H02P 31/00 318/400.01 |
| 8,504,646 B2* | 8/2013 | Jeung | H02P 31/00 709/217 |
| 8,561,921 B1 | 10/2013 | Showman et al. | |
| 9,645,561 B2* | 5/2017 | Borke | G05B 15/02 |
| 9,670,919 B2 | 6/2017 | Kieffer et al. | |
| 10,041,844 B1* | 8/2018 | Brady | G06Q 50/06 |
| 10,130,221 B2* | 11/2018 | Borke | G05B 15/02 |
| 10,139,840 B2* | 11/2018 | Quinones | G01F 25/0092 |
| 10,430,263 B2* | 10/2019 | Polar Seminario | G06F 11/1441 |
| 10,690,548 B2* | 6/2020 | Brady | G01K 1/022 |
| 10,791,886 B2* | 10/2020 | Borke | G05B 15/02 |
| 10,865,788 B2* | 12/2020 | Afshari | F04C 2/18 |
| 2001/0032036 A1* | 10/2001 | Sudolcan | B67D 1/0888 700/236 |
| 2002/0059467 A1 | 5/2002 | Rapp et al. | |
| 2006/0272384 A1* | 12/2006 | Lewis | G01F 25/0007 73/1.16 |
| 2006/0272385 A1* | 12/2006 | Lewis | G01F 25/0007 73/1.16 |
| 2009/0293733 A1* | 12/2009 | Martin | G07F 13/065 99/280 |
| 2009/0315494 A1* | 12/2009 | Jeung | H02P 31/00 318/400.09 |
| 2009/0315496 A1* | 12/2009 | Jeung | H02P 31/00 318/558 |
| 2009/0315497 A1* | 12/2009 | Jeung | H02P 31/00 318/558 |
| 2009/0315498 A1* | 12/2009 | Jeung | H02P 31/00 318/558 |
| 2010/0114365 A1* | 5/2010 | Sudolcan | B67D 1/0888 700/232 |
| 2013/0007316 A1 | 1/2013 | Moon et al. | |
| 2013/0338821 A1* | 12/2013 | Igarashi | B01F 15/0245 700/233 |
| 2014/0081463 A1* | 3/2014 | Igarashi | B01F 13/1063 700/265 |
| 2014/0114469 A1* | 4/2014 | Givens | B67D 1/0041 700/232 |
| 2014/0295044 A1* | 10/2014 | Cocchi | A23G 9/22 426/520 |
| 2015/0107678 A1* | 4/2015 | Igarashi | G05D 7/0617 137/3 |
| 2015/0253782 A1* | 9/2015 | Igarashi | B01F 11/0094 700/265 |
| 2016/0090288 A1* | 3/2016 | Givens, Jr. | B67D 1/0888 700/283 |
| 2016/0153441 A1 | 6/2016 | Fehr et al. | |
| 2016/0158784 A1 | 6/2016 | Fehr et al. | |
| 2016/0167066 A1 | 6/2016 | Fehr et al. | |
| 2016/0214817 A1* | 7/2016 | Borke | A47K 5/1217 |
| 2016/0319826 A1 | 11/2016 | Shanks et al. | |
| 2016/0325957 A1* | 11/2016 | Borke | A47K 5/1217 |
| 2017/0039372 A1* | 2/2017 | Koval | G01D 4/004 |
| 2017/0068257 A1* | 3/2017 | Quinones | G01M 5/00 |
| 2017/0126843 A1 | 5/2017 | Pantea et al. | |
| 2017/0186110 A1* | 6/2017 | Carpenter | G06Q 50/12 |
| 2017/0220404 A1* | 8/2017 | Polar Seminario | G06F 11/0736 |
| 2017/0277205 A1 | 9/2017 | Tix et al. | |
| 2018/0252213 A1* | 9/2018 | Afshari | F16H 61/4035 |
| 2018/0291895 A1* | 10/2018 | Afshari | F04C 14/24 |
| 2018/0292270 A1* | 10/2018 | Brady | G01F 15/063 |
| 2019/0029477 A1* | 1/2019 | Borke | A47K 10/36 |
| 2019/0064004 A1* | 2/2019 | Brady | G01K 7/01 |
| 2019/0335688 A1* | 11/2019 | Tirupathi | G06N 5/025 |
| 2020/0012488 A1* | 1/2020 | Koval | G06F 8/71 |

\* cited by examiner

MODULAR PLURAL COMPONENT PLATFORM

CROSS-REFERENCE TO RELATED APPLICATION

This application claims priority from and the benefit of U.S. Provisional Patent Application No. 62/718,219, entitled "MODULAR PLURAL COMPONENT PLATFORM," filed Aug. 13, 2018, which is hereby incorporated by reference in its entirety for all purposes.

BACKGROUND

The present disclosure generally relates to fluid mixing and dispensing systems, and more specifically, to modular platforms for fluid mixing and fluid dispensing.

In the field of fluid mixing and dispensing systems, sensing components (e.g., sensors, flow meters) may monitor various parameters associated with component hardware that performs mixing and dispensing operations. Control systems facilitate management and monitoring of various hardware components by receiving inputs from a user interface and controlling the component hardware in accordance with the inputs. Parameters associated with the component hardware may also be displayed on a user interface. Typically, as new and/or different component hardware is installed in a fluid management system, the system is redesigned or replaced to accommodate the new and/or different component hardware. For example, a control system with associated software may be designed to operate for a specific configuration of component hardware.

BRIEF DESCRIPTION

Certain embodiments commensurate in scope with the originally claimed embodiments are summarized below. These embodiments are not intended to limit the scope of the claimed embodiments, but rather these embodiments are intended only to provide a brief summary of possible forms of the claimed embodiments. Indeed, the present disclosure may encompass a variety of forms that may be similar to or different from the embodiments set forth below.

In a first embodiment, a method includes receiving, via a processor, a unit configuration for a fluid mixing and dispensing system, where the unit configuration includes one or more fluid hardware components. The method also includes determining one or more software modules corresponding to the one or more fluid hardware components and configuring a modular plural component platform by loading the one or more software modules corresponding to the one or more fluid hardware components.

In a second embodiment, a plural component fluid delivery system includes a user interface, one or more fluid hardware components, and a modular plural component platform having a controller and a hardware abstraction layer. The controller includes a processor and a memory and is configured to receive a unit configuration including the one or more fluid hardware components, determine one or more software modules corresponding to the one or more fluid hardware components, and configure the modular plural component platform by loading the one or more software modules corresponding to the one or more fluid hardware components.

In a third embodiment, one or more tangible, non-transitory, machine-readable media comprising instructions are configured to cause a processor to receive a unit configuration for a plural component fluid delivery system having one or more fluid hardware components, determine one or more software modules corresponding to the unit configuration, and configure the modular plural component platform by loading the one or more software modules corresponding to the unit configuration.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed to systems and methods for modular plural component platforms. The modular plural component platforms described herein provide control and communication for fluid mixing and dispensing hardware. While, in order to provide context, the modular plural component platforms are described in view of their application to paint spray applications, other applications may include industrial/chemical mixing and processing systems, fuel and hydraulic delivery systems, and so on.

The techniques described herein allow and enable plural component platforms to be reconfigured based upon a given configuration of component hardware. A common control system may have reconfigurable software modules corresponding to specific component hardware. The software modules are interchangeable such that modules may be installed and/or uninstalled to the common control system to match the component hardware for a particular configuration. As such, the common control system may be used for a variety of fluid mixing and dispensing operations that require varying software modules.

Figure 1:
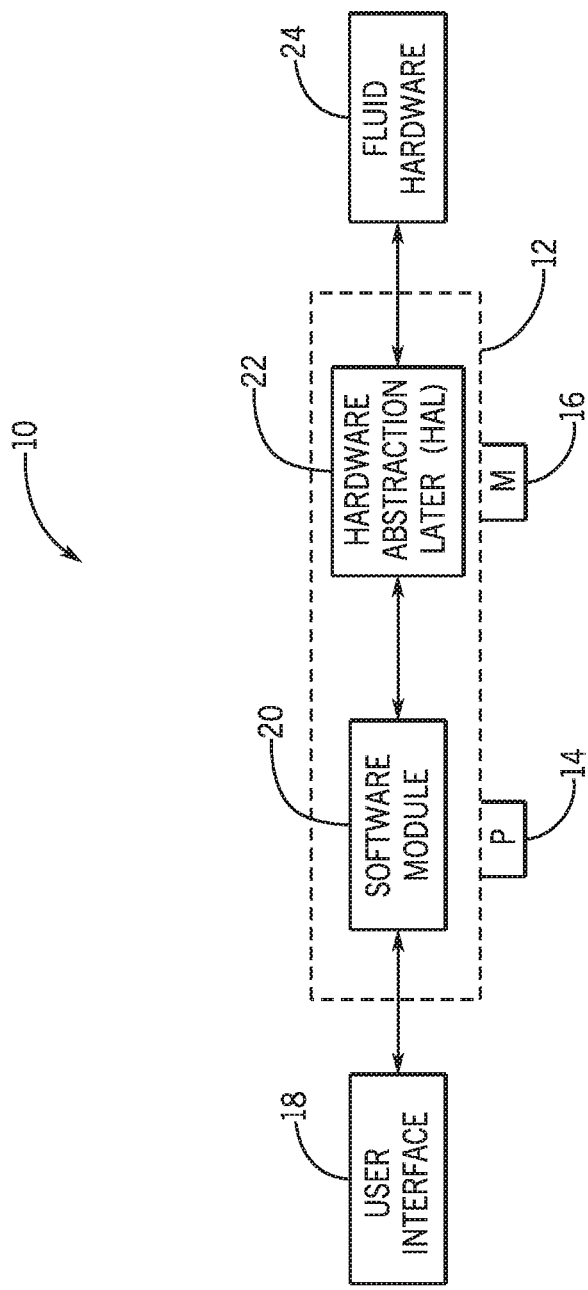
FIG. 1 is a block diagram of an embodiment of a modular plural component platform, in accordance with aspects of the present disclosure.

With the foregoing in mind, it may be useful to describe a modular plural component platform that may incorporate the techniques described herein, for example, to enable efficient operation of plural component platforms. Accordingly, FIG. 1 is a block diagram of an embodiment of a modular plural component platform 10 which may be suitable for a variety of fluid mixing and dispensing applications, such as fluid (e.g., paint) spray applications. In the depicted embodiment, the modular plural component platform 10 includes a user interface 18, a common control system 12 having one or more software modules 20 and a hardware abstraction layer (HAL) 22, and fluid hardware 24.

The common control system 12 is configured to receive inputs from the user interface 18 and provide outputs to the fluid hardware 24, or vice versa.

The common control system 12 may include an industrial controller, and thus include a processor 14 and a memory 16. The processor 14 may include multiple microprocessors, one or more "general-purpose" microprocessors, one or more special-purpose microprocessors, one or more application specific integrated circuits (ASICS), and/or one or more reduced instruction set (RISC) processors, or some combination thereof. The memory 16 may include a volatile memory, such as random access memory (RAM), and/or a nonvolatile memory, such as ROM, a hard drive, a memory card, a memory stick (e.g., USB stick) and so on. The memory 16 may include computer programs or instructions executable by the processor 14 and suitable for controlling the modular plural component platform 10. The memory 16 may further include computer programs or instructions executable by the processor 14 and suitable for detecting various values and providing control actions, as described below. In certain embodiments, the processor 14, the memory 16, and/or other portions of the common control system 12 and/or the modular plural component platform 10 may be included in a programmable logic controller (PLC). For example, a PLC may be configured to receive signals indicative of devices connected to the modular plural component platform 10 (i.e., via a discrete input/output (I/O) interface) and/or signals indicative of control operations. The PLC may also output signals corresponding to the connected devices and/or indicative of the control operations.

The user interface 18 is configured to display values, images, and other information of the modular plural component platform 10. Such values may include parameters measured at the fluid hardware 24 and/or values determined by the software modules 20 based on the measured parameters. In some embodiments, the user interface 18 may also provide options to a user of the modular plural component platform 10. For example, the user interface 18 may display options to adjust a parameter or value of the modular plural component platform 10. The user interface 18 may also display options for the modular plural component platform 10 to enter a specific operating mode (e.g., to begin a mixing cycle, to dispense one or more fluids, etc.). Based on the various options presented to a user, the user may provide user inputs to the modular plural component platform 10 via the user interface 18. For example, a user may provide an input to adjust a flow rate via the user interface 18. The user interface 18 may be a local and/or a remote interface. For example, the user interface 18 may be locally connected to the common control system 12 via a wired connection or may be remotely connected to the common control system 12 via a wireless connection.

The user interface 18 may send signals indicative of the user inputs to the common control system 12. The software modules 20 of the common control system 12 may receive the input signals from the user interface 18. In some embodiments, the software modules 20 may include a controller, a flow meter module, a motor power module, a user interface module, and other similar software modules. Based upon the user inputs received from the user interface 18, the software modules 20 may determine values to be sent to the HAL 22. In some embodiments, the values determined by the software modules 20 may be actual values of an adjustment, such as an adjustment to an operating parameter, to be made to the fluid hardware 24. For example, if a user provides an input to the user interface 18 to adjust a flow rate to a target flow rate, a software module 20 may compare the target flow rate to a measured flow rate and provide an output to the HAL 22 indicating the value of the actual flow rate adjustment. In some embodiments, the software modules 20 may also provide values and parameters to be displayed at the user interface 10 based on values received from the HAL 22.

The HAL 22 may receive the actual values from the software modules 20 and generate abstract values representative of the actual values for output to the fluid hardware 24. For example, if the HAL 22 receives an actual value indicating an adjustment to a flow rate, the HAL 22 may convert the actual flow rate adjustment to an abstract value and provide the abstract value to the fluid hardware 24 (e.g., to a pump and/or a valve). Indeed, the HAL 22 is configured to convert and abstractly represent the values received from the software modules 20. Based on the abstract value determined by the HAL 22, a signal indicative of the abstract value may be generated by the common control system 12 and sent to the fluid hardware 24. Additionally, the HAL 22 may include independent hardware interface modules configured to communicate to specific software modules 20 and specific components of the fluid hardware 24.

The fluid hardware 24 may receive the signal indicative of the abstract value from the common control system 12 and determine an appropriate action based on the abstract value. For example, if the common control system 12 provides an output signal indicative of instructions to adjust a flow rate, a pump and/or a valve of the fluid hardware 24 may adjust a flow rate accordingly. In some embodiments, the common control system 12 may also receive data from the fluid hardware 24, which may include various measurements. The data received from the fluid hardware 24 facilitates control of various fluid mixing and dispensing parameters by the common control system 12.

Figure 2:
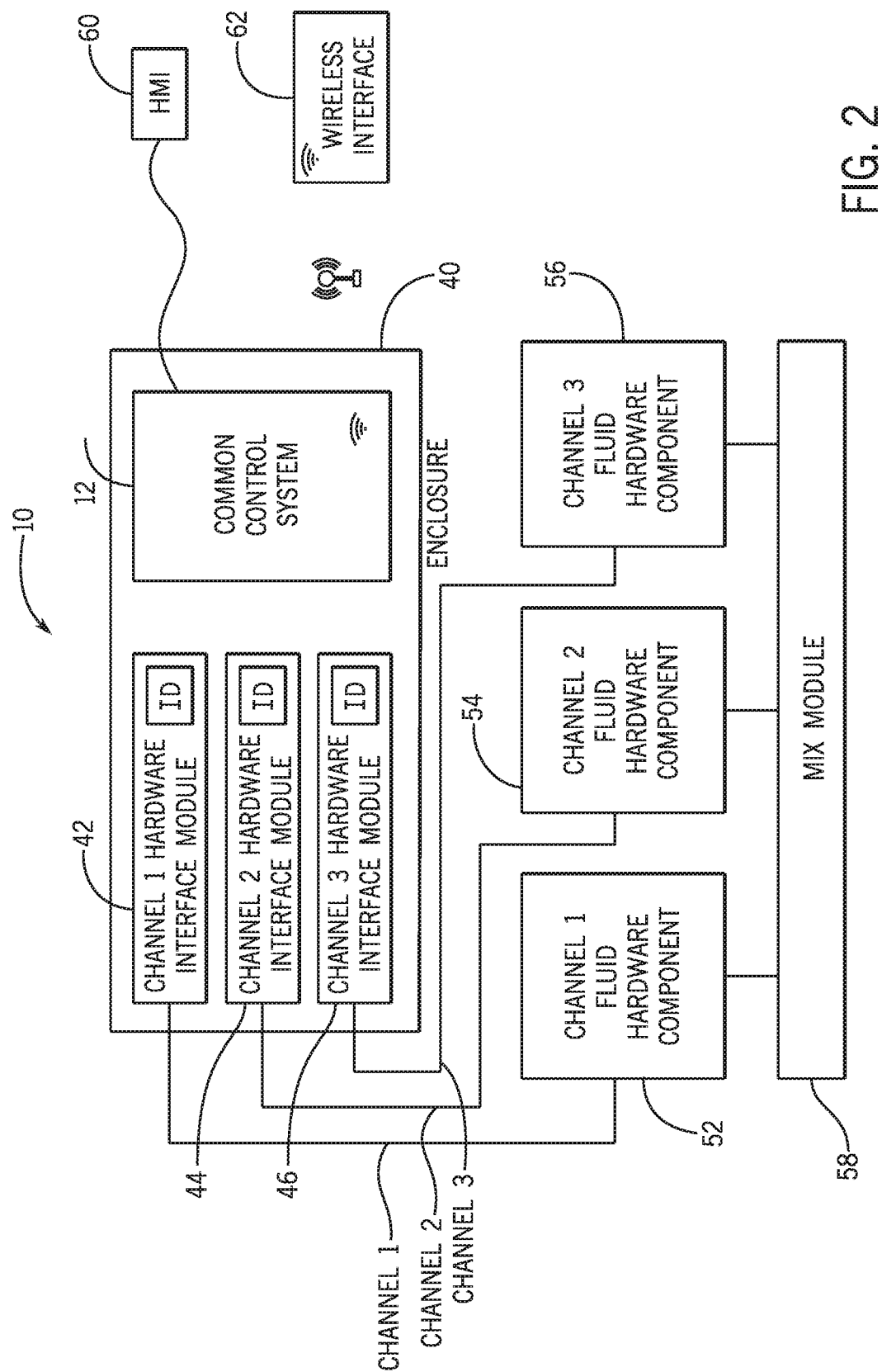
FIG. 2 is a schematic diagram of an embodiment of channels of the modular plural component platform of FIG. 1, in accordance with aspects of the present disclosure.

FIG. 2 is a schematic diagram of an embodiment of channels of the modular plural component platform 10 of FIG. 1. The modular plural component platform 10 may include channels configured to provide communication between fluid hardware 24 and the common control system 12. As described herein, the common control system 12 is configured to provide various monitoring and control functions for the modular plural component platform 10. In one embodiment, each particular component of the fluid hardware 24 is assigned an independent channel of the modular plural component platform 10. The independent channel is configured to provide communication between the specific component of fluid hardware 24, a corresponding hardware interface module of the HAL 22, and a corresponding software module 20. As depicted, the common control system 12 is included in an enclosure 40 with a channel one hardware interface module 42, a channel two hardware interface module 44, and a channel three hardware interface module 46. The modular plural component platform 10 may also have more or less than three channels.

Each channel hardware interface module (i.e., the channel one hardware interface module 42, the channel two hardware interface module 44, and the channel three hardware interface module 46) may include identification data ("ID") that enables the channel hardware interface module to detect and identify coupled fluid hardware component(s). The ID may include specific identification data corresponding to specific fluid hardware components and/or specific identification data corresponding software modules that may be loaded by the common control system 12. The ID may be stored in a memory corresponding to each channel hardware interface module. Each channel hardware interface module may detect a specific identity of a coupled fluid hardware component via radio-frequency identification (RFID) tags, barcodes, optical identification codes, or any other suitable techniques that correspond to the ID. Based upon the detected identity of the fluid hardware component, the channel hardware interface module may determine which fluid hardware component has been coupled and/or connected to the common control system 12. In certain embodiments, the channel hardware interface module may also determine which software modules should be loaded to the common control system 12. As such, each channel may be reconfigurable to connect to and provide communication for varying unit configurations. For example, the channel one hardware interface module 42 may connect to a first type of fluid component in a first configuration and connect to a second and different type of component in a second configuration. As such, the modular plural component platform 10 may include channels that reconfigure manually and/or automatically to connect to and provide communication for various types of fluid components. In certain embodiments, the ID may be used by the common control system 12 to automatically identify the configuration of the respective fluid hardware channel (e.g., channel 1, channel 2, etc.). For example, the channel hardware interface module may be a particular component that corresponds to a fluid hardware component, and the ID may specify the particular component.

Each channel hardware interface module (i.e., the channel one hardware interface module 42, the channel two hardware interface module 44, and the channel three hardware interface module 46) is configured to provide an interface between a component of fluid hardware and the common control system 12. In the embodiment of FIG. 2, the channel one hardware interface module 42 is in communication with a channel one fluid hardware component 52 via channel one. The channel two hardware interface module 44 is in communication with a channel two fluid hardware component 54 via channel two. The channel three hardware interface module 46 is in communication with a channel three fluid hardware component 56 via channel three. Additionally, the channel one fluid hardware component 52, the channel two fluid hardware component 54, and the channel three fluid hardware component 56 are each in communication with a mixing module 58 via their respective channels. The mixing module 58 may include various fluid mixing and dispensing systems. For example, the mixing module 58 may be a paint spray mixer and/or an applicator.

Further, the common control system 12 may be controlled via a human-machine interface (HMI) 60 (e.g., a user interface) that is physically and/or communicatively connected to the enclosure 40. In addition to or independent of the HMI 60, the common control system 12 may also be controlled by a wireless interface 62. The wireless interface 62 may include a tablet, phone, or similar device that provides for user interaction and control of the common control system 12. In some embodiments, the HMI 60 and/or the wireless interface 62 include the user interface 18 described herein. As described herein, a user or users may interface with the common control system 12 via a user interface 18, which may include touchscreens, displays, keyboards, mice, augmented reality/virtual reality systems, as well as tablets, smartphones, notebooks, and so on. In certain embodiments, the HMI 60 may be omitted from the modular plural component platform 10 (e.g., the modular plural component platform 10 may lack a physical user interface communicatively connected to the enclosure 40).

In some embodiments, the common control system 12 may be controlled via communication protocol from another source, such as a different/separate controller or PLC. The communication protocol may include ethernet/IP, ProfitNet, Modbus, other types of communication protocol, or a combination thereof. For example, in embodiments of the modular plural component platform 10 with or without the HMI 60, the common control system 12 may be controlled via the communication protocol from the different/separate controller or PLC (e.g., the modular plural component platform 10 may include the different/separate controller or PLC in addition to or in place of the HMI 60).

Figure 3:
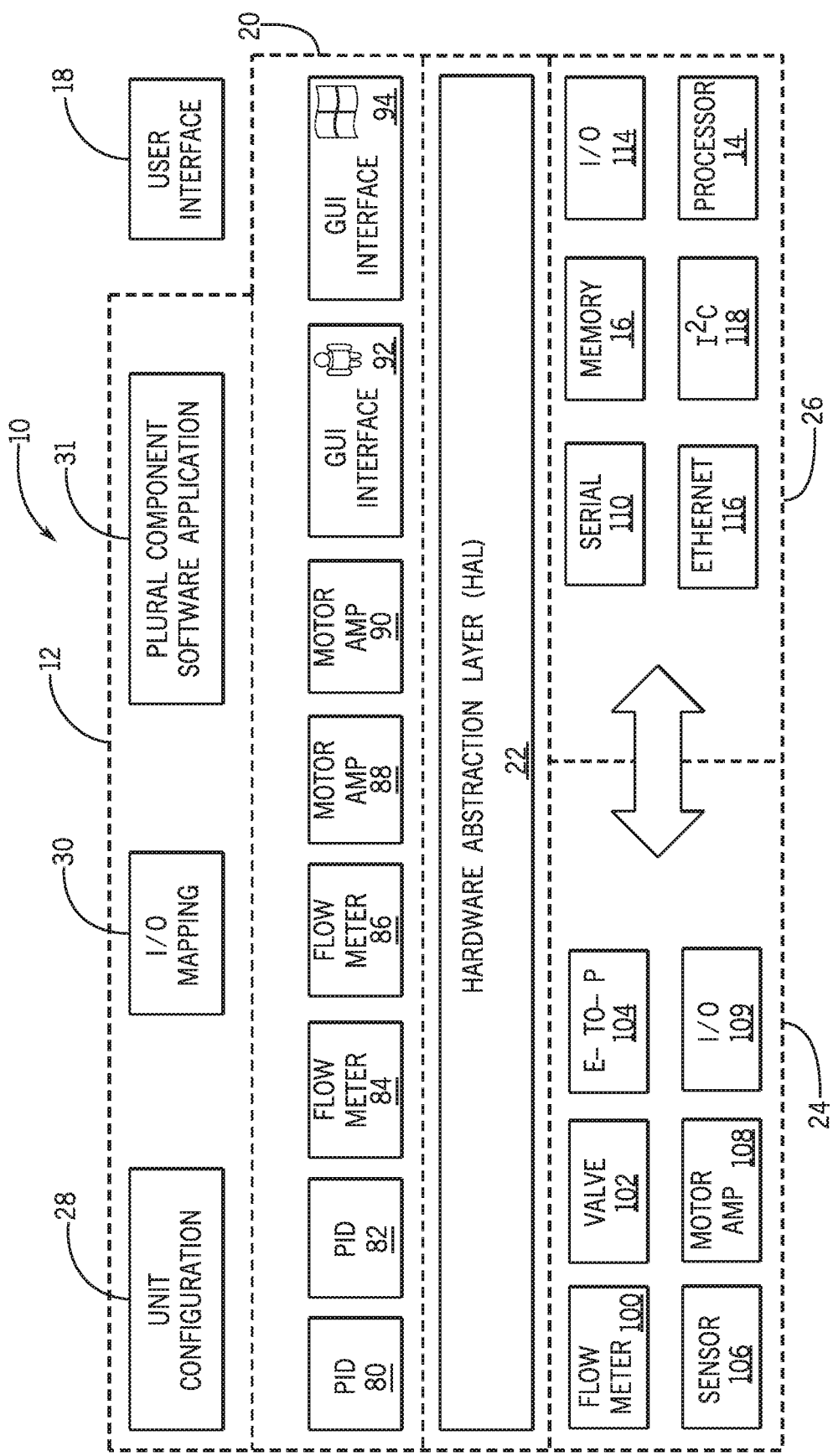
FIG. 3 is a block diagram of an embodiment of the modular plural component platform of FIG. 1, in accordance with aspects of the present disclosure.

FIG. 3 is a block diagram of an embodiment of the modular plural component platform 10 of FIG. 1. As illustrated, the modular plural component platform 10 includes the user interface 18, the common control system 12, and fluid hardware 24. The common control system 12 may provide control actions to the fluid hardware 24 based on inputs from the user interface 18 and may provide values to be displayed at the user interface 18 based on values and parameters received from the fluid hardware 24. As depicted, the common control system 12 includes subgroups comprising the software modules 20, the HAL 22, a printed circuit board (PCB) 26, a unit configuration file 28, an I/O mapping file 30, and a plural component software application 31.

The software modules 20 include software that may perform various functions of the modular plural component platform 10. As illustrated in FIG. 3, the software modules 20 include proportional-integral-derivative (PID) controllers 80 and 82, flow meters 84 and 86, motor controllers 88 and 90, and user interface modules 92 and 94. In some embodiments, the software modules 20 may include other types of modules. The PID controllers 80 and 82 are configured to determine whether the common control system 12 should perform a control action. For example, the PID controllers 80 and 82 may receive an input to maintain a specified flow rate at the fluid hardware 24. Based on the specified flow rate, the PID controllers 80 and 82 may determine whether a control action should be performed by the common control system 12 by comparing the specified flow rate to a measured flow rate determined and/or received by the flow meters 84 and 86 from the fluid hardware 24. Based on the determination by the PID controllers 80 and 82, the motor controllers 88 and 90 are configured to generate and/or send a signal indicative of a flow rate value to the fluid hardware 24 via the HAL 22. The flow rate value may be an adjustment to the flow rate at the fluid hardware 24. In certain embodiments, pumps may control the flow rate at the fluid hardware 24 in addition to, or in place of, the motor controllers 88 and 90.

The user interface modules 92 and 94 are configured to receive data and inputs from the user interface 18 and provide the data and inputs to the relevant portions of the common control system 12. For example, the user interface modules 92 and 94 may receive the specified flow rate described herein and output a signal to the PID controllers 80 and 82 indicative of the specified flow rate. The user interface modules 92 and 94 are also configured to provide data and outputs to the user interface 18 from the common control system 12. Each software module 20 may correspond to a specific fluid of the mixing module (e.g., a PID controller, a flow meter, and a motor controller may correspond to a specific fluid).

The common control system 12 may be configured to provide signals to the fluid hardware 24 via the PCB 26. As illustrated, the PCB 26 includes a processor 14, the memory 16, serial communication 110, PCB inputs/outputs (I/O) 114, ethernet communication 116, and an inter-integrated circuit ($I^2C$) 118. The PCB 26 may also have other components configured to provide processing, memory, and/or communication functions. The processor 14 is configured to execute the computer programs and instructions included in the software modules 20 and other modules of the common control system 12. For example, the processor 14 may determine, via a computer program or instructions of the PID controller 80 or 82, that a flow rate should be adjusted and may output a command and/or signal accordingly. The memory 16 may include the computer programs or instructions executable by the processor 14 and store the various values measured at the fluid hardware 24.

The PCB I/O 114 is configured to provide input and output connections at the PCB 26 for the serial communication 110 and the ethernet communication 116. In certain embodiments, other forms of communication may be used in the common control system 12 (e.g., Bluetooth, WIFI, etc.). The PCB I/O 114 may be specific to the individual software modules 20, the individual components of fluid hardware 24, and/or the individual components of the PCB 26 in accordance with the unit configuration 28 described herein. The serial communication 110 and the ethernet communication 116 may provide communication paths from the PCB 26 to the fluid hardware 24. For example, the serial communication 110 and/or the ethernet communication 116 may carry a signal from the PCB 26 to the fluid hardware 24 with instructions to adjust a flow rate. The $I^2C$ 118 may provide an interface for the processor 14 to communicate with peripheral devices of the PCB 26. In certain embodiments, other forms of communication may provide an interface for the processor 14 to communicate with peripheral devices of the PCB 26.

The unit configuration 28 includes the specific configuration of fluid hardware 24 and software modules 20. In certain embodiments, the unit configuration 28 may be identified by a user of the modular plural component platform 10 and provided as input(s) to the user interface 18. Based on the user input(s) to the user interface 18, the common control system 12 may load software modules 20 corresponding to the user input(s). The unit configuration 28 may also include the specific channels connected to each software module 20, each component of fluid hardware 24, and other aspects of the modular plural component platform 10.

In certain embodiments, the unit configuration 28 may be automatically detected by the modular plural component platform 10 via a discrete I/O interface or a network I/O interface. For example, as the fluid hardware 24 is connected to the modular plural component platform 10, a discrete I/O interface may be configured to automatically detect the specific components of the fluid hardware 24 that are connected and output signals to the common control system 12 to load corresponding software modules 20. The discrete I/O interface may operate via discrete digital signals and/or discrete analog signals. Additionally, the discrete I/O interface may be included in a PLC. For example, the modular plural component platform 10 may include a PLC that includes a discrete I/O interface and/or other portions of the modular plural component platform 10 described herein. In certain embodiments, a network I/O interface may be configured to detect the specific components of fluid hardware 24 that are connected and communicate the identity of each component to a PLC of the common control system 12. The various unit configurations 28 that may be employed by the modular plural component platform 10 may be stored to the memory 16.

The I/O mapping file 30 includes a list of connected fluid hardware I/O locations based on the PCB I/O 114 of the PCB 26 and fluid hardware I/O 109 of the fluid hardware 24. The I/O mapping file 30 maps I/O signals from to the user interface 18 to the PCB 26, from the PCB 26 to the user interface 18, from the PCB 26 to the fluid hardware 24, and from the fluid hardware 24 to the PCB 26. The I/O mapping file 30 may change as components of the fluid hardware 24 are installed and/or uninstalled, and the I/O mapping file 30 may be loaded from the memory 16 based on the unit configuration 28 of the modular plural component platform 10. In certain embodiments, the I/O mapping file 30 may be updated based on components of the fluid hardware 24 detected at a discrete I/O interface.

The plural component software application 31 provides the general software for configuring and controlling the common control system 12. For example, the software may be configured to read inputs provided to the modular plural component platform 10, determine what actions should be performed by the common control system 12, provide outputs based on those control actions, and iteratively repeat the process as necessary. In some embodiments, the plural component software application 31 may also output an output signal to change the loaded software modules 20 based on a specific unit configuration 28.

As illustrated in FIG. 3, the fluid hardware 24 includes a flow meter 100, a valve 102, an electrical-to-pressure (EP) transducer 104, a sensor 106, a motor amp 108, and the fluid hardware I/O 109. In some embodiments, the fluid hardware 24 may also include other fluid components. Each component of fluid hardware 24 is configured to communicate with the common control system 12 via independent channels as described herein. Further, each component of fluid hardware 24 is configured to receive signals from the HAL 22 of the common control system 12 and perform various actions in response to those received signals. For example, a motor amp 108 may adjust a flow rate in response to a received signal from the common control system 12. The valve 102 may control a movement of a fluid among the fluid hardware 24. The fluid hardware I/O 109 may identify the physical locations for receiving and outputting signals at the fluid hardware 24 and may be mapped to the PCB I/O 114. The various components of the fluid hardware 24 may be integrated with and/or connected to the mixing module 58, as described in reference to FIG. 2.

Figure 4:
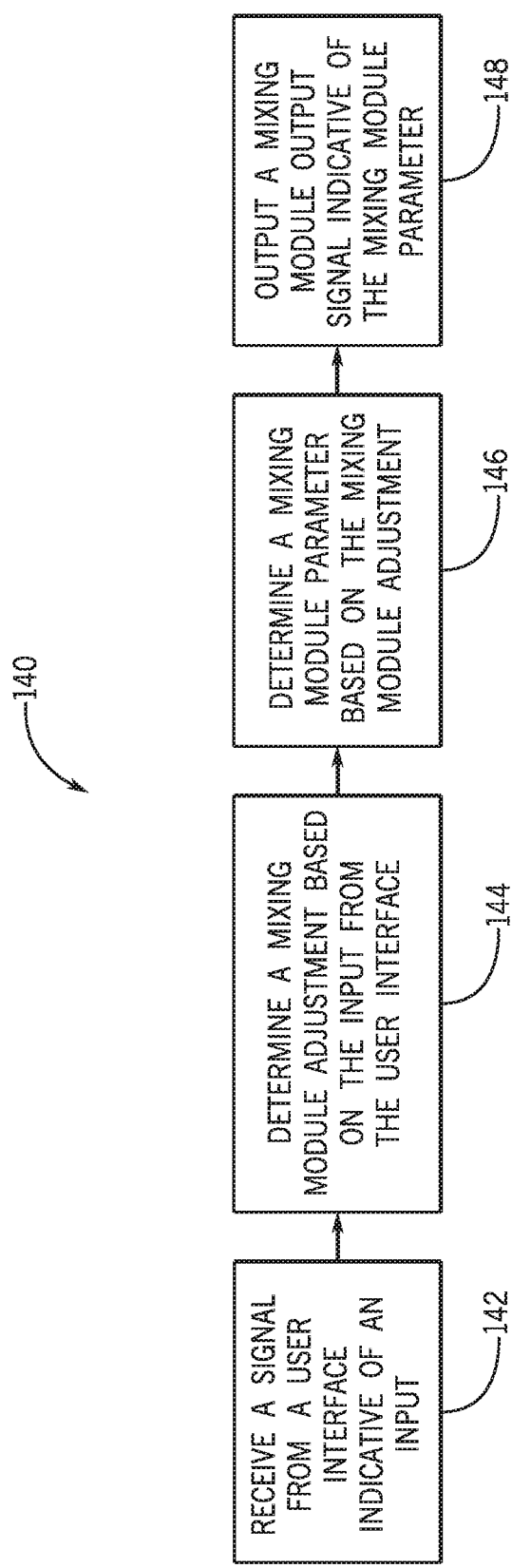
FIGS. 4 and 5 are flow diagrams of an embodiment of a control system of the modular plural component platform of FIG. 1, in accordance with aspects of the present disclosure.

FIG. 4 is a flow diagram 140 illustrating operation of an embodiment of the common control system 12 of the modular plural component platform 10 of FIG. 1. As noted herein, a user may interact with the user interface 18 to provide various inputs to the modular plural component platform 10. In some embodiments, the inputs may include a flow rate, a motor speed, a mixing ratio, and/or other mixing module parameters. At block 142, the common control system 12 receives a signal from the user interface 18 indicative of the inputs. In certain embodiments, the signal indicative of an input may be received via a discrete I/O interface of a PLC and/or a communication network interacting with the PLC. For example, an input may be provided to the user interface 18 and output via an output signal to the discrete I/O interface. The discrete I/O interface may receive the signal indicative of the input and may output a signal indicative of the input to a controller of the common control system 12 (e.g., a controller of the PLC).

At block 144, the common control system 12 determines a mixing module adjustment based on the input from user interface 18. For example, the PID controllers 80 and 82 may compare a received input from the user interface 18 to a sensed measurement from a component of the fluid hardware 24 to determine if an adjustment should be made to that component. In some embodiments, the common control system 12 may also be configured to iteratively determine a mixing module adjustment that will achieve the input. For example, the common control system 12 may iteratively determine and generate output signals to adjust a measured flow rate until a target flow rate corresponding to a user input is achieved. In certain embodiments, the PID controllers 80 and 82 may iteratively adjust various parameters of coupled fluid hardware independent of a user input (e.g., the common control system 12 may perform closed-loop control of coupled fluid hardware).

At block 146, the common control system 12 determines a parameter that will be output to the fluid hardware 24. The HAL 22 is configured to receive the adjustment determined by the respective software module 20 and determine an abstract parameter to be output to the fluid hardware 24. The abstract parameter may correspond to the adjustment determined by respective software module 20 and may be output by the common control system 12 to the fluid hardware 24 via a mixing module output signal, as indicated by block 148. In certain embodiments, the mixing module output signal may be output via a discrete I/O interface. The fluid hardware 24 may be configured to perform an adjustment based on the abstract parameter included in the mixing module output signal received from the common control system 12. Accordingly, for varying configurations of the fluid hardware 24, the common control system 12 may be configured to receive inputs at the user interface 18, determine adjustments based on the inputs, and output signals indicative of such adjustments to the fluid hardware 24.

Figure 5:
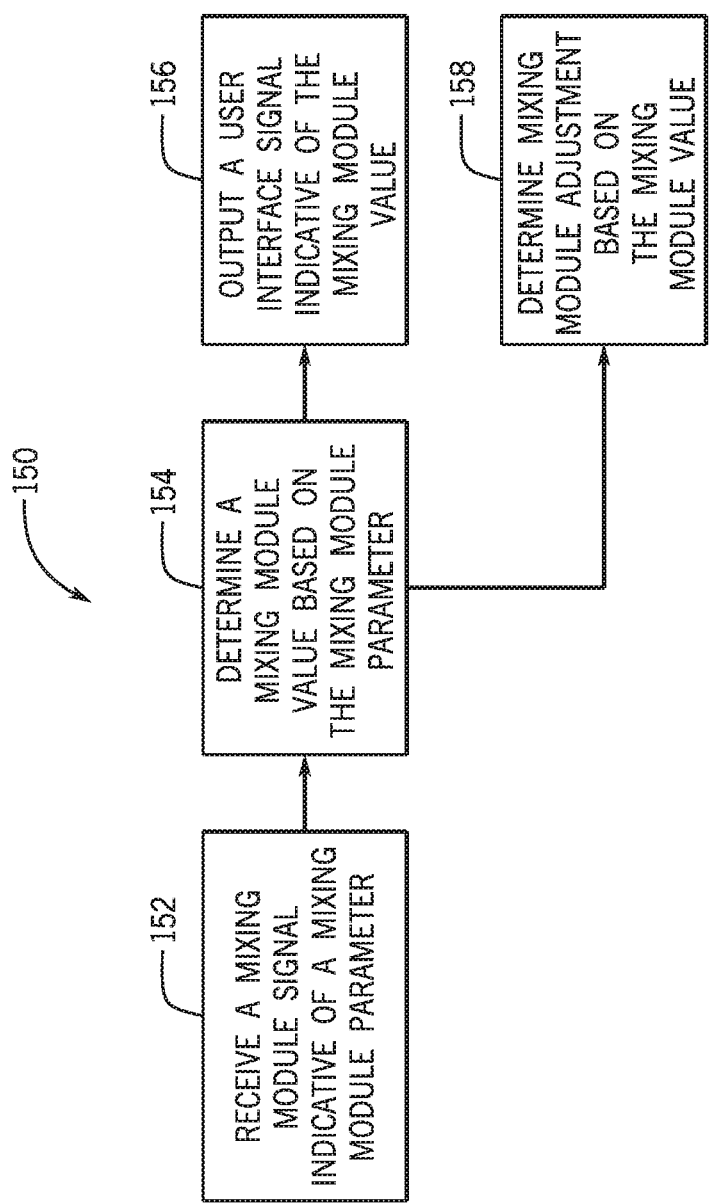

FIG. 5 is a flow diagram 150 illustrating operation of an embodiment of the common control system 12 of the modular plural component platform 10 of FIG. 1. In addition to performing control operations of the modular plural component platform 10, the common control system 12 may be configured to receive an abstract parameter indicative of a sensed measurement of the fluid hardware 24 and display that measurement to a user. At block 152, the common control system 12 receives a mixing module signal indicative of the abstract parameter. The signal may be received at processor 14 of the PCB 26 via the serial communication 110 and/or the ethernet communication 116. In some embodiments, the mixing module may include the fluid hardware 24.

After the common control system 12 receives the abstract value indicative of a sensed parameter, the HAL 22 may determine an actual value associated with the abstract value, as indicated by block 154. The HAL 22 may then provide the actual value to a software module 20 to be output to the user interface 18. For example, the HAL 22, via the plural component software application 31, may provide the actual value to the user interface module 92 or 94. At block 156, the common control system 12 may output a user interface signal indicative of the mixing module value, which may correspond to a measurement of the fluid hardware 24. In some embodiments, the processor 14 may output the user interface signal to the user interface 18. In response to receiving the signal, the user interface 18 may display the mixing module value.

At block 158, the common control 12 may determine a mixing module adjustment based on the mixing module value. For example, the PID controllers 80 and/or 82 of the common control system 12 may compare the mixing module value to a target value, and, based on the comparison, may determine a mixing module adjustment that may achieve the target value or incrementally adjust the mixing module value toward the target value. The target value may be value received from the user interface 18 or may be independently determined by the common control system 12. Additionally, the PID controllers 80 and 82 may determine the mixing module adjustment (e.g., block 158) in addition to or independent of providing the mixing module value to the user interface 18 (e.g., block 156). The common control system 12 may perform one or more of the blocks included in the flow diagram 150 automatically at periodic intervals, automatically based on a triggering event, and/or based on an input provided to the user interface 18.

Figure 6:
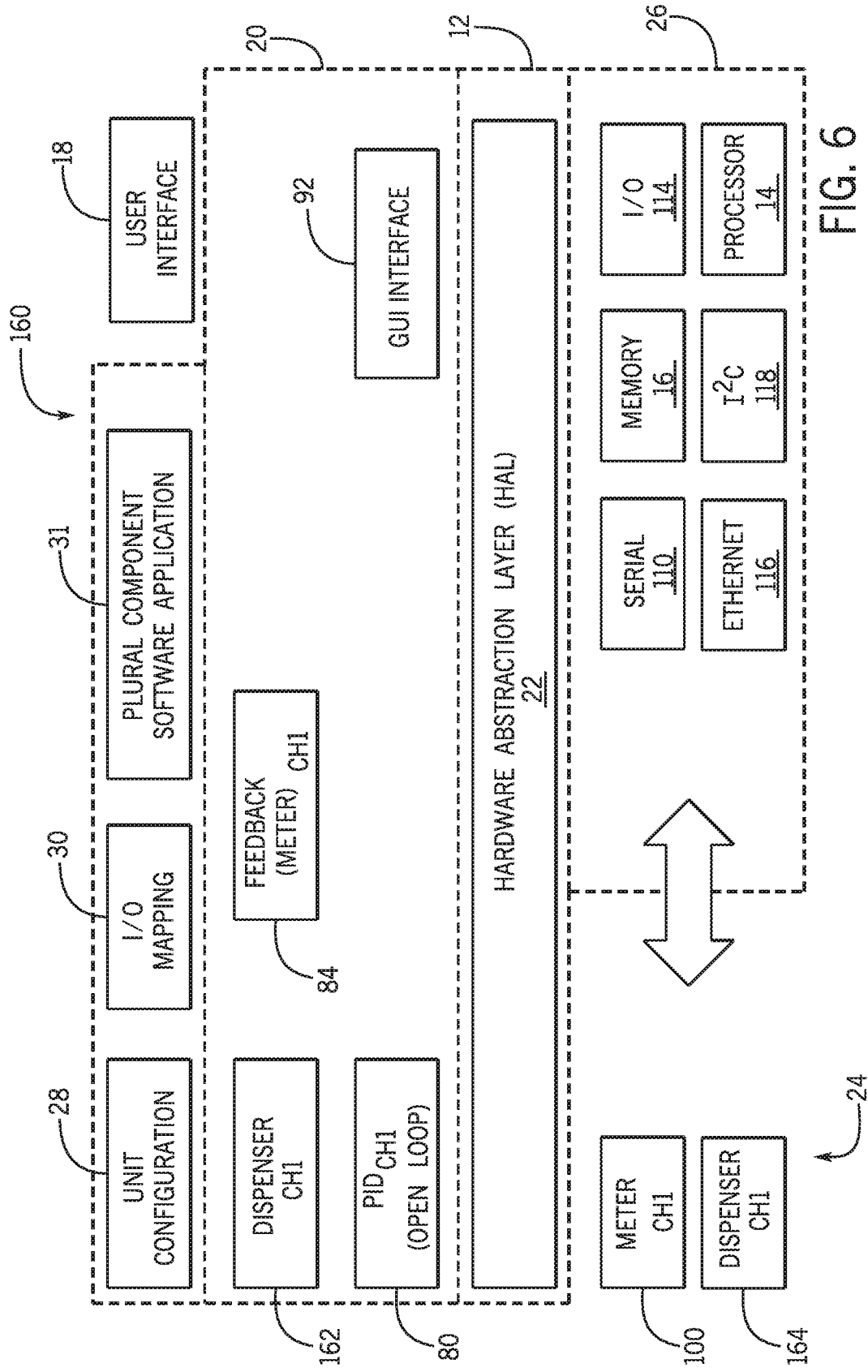
FIGS. 6 and 7 are block diagrams of embodiments of the modular plural component platform of FIG. 1, in accordance with aspects of the present disclosure.

FIG. 6 is a block diagram 160 of an embodiment of the modular plural component platform 10 of FIG. 1. The embodiment shown in the block diagram 160 depicts a unit configuration for a single component (i.e., a unit configuration for an application dispensing a single fluid). Accordingly, the modular plural component platform 10 is reconfigurable to control a single component. As illustrated, the modular plural component platform 10 for a single component includes a common control system 12, a user interface 18, and fluid hardware 24. Because the block diagram 160 is configured for a single component, the modular plural component platform 10 includes a single channel (channel one) to which components of the common control system 12 and the fluid hardware 24 are connected. For example, the fluid hardware 24 includes a meter 100 and a dispenser 164 for the single fluid, both of which are connected to channel one. The common control system 12 comprises software modules including a PID controller 80, a feedback meter module 84, and a dispenser module 162, each of which are also connected to channel one. The common control system 12 also includes a user interface module 92 configured to communicate with the user interface 18. In some embodiments, the fluid hardware 24 and the software modules for modular plural component platform 10 having a single fluid may also be connected via multiple channels. For example, the feedback meter module 84 may be connected to the meter 100 via a first channel, and the dispenser module 162 may be connected to the dispenser 164 via a second channel.

In addition to having the software modules including the PID controller 80, the feedback meter module 84, and the dispenser module 162, the common control system 12 of FIG. 6 includes many similar components to those illustrated and described in reference to FIG. 3. In particular, the common control system 12 of the illustrated embodiment of FIG. 6 includes a HAL 22, a unit configuration file 28, an I/O mapping file 30, a plural component software application 31, and a PCB 26. The PCB 26 includes a processor 14, a memory 16, PCB I/O 114, serial communication 110, ethernet communication 116, and I²C 118.

Accordingly, each of the components of the modular plural component platform 10 is configured to operate in an embodiment for a single fluid. For example, the meter 100 may measure a flow rate of the fluid and provide a parameter indicative of the flow rate to the HAL 22 of the common control system 12. The HAL 22 may convert the parameter to an actual flow rate value and provide the value to the feedback meter module 84. A user may also provide an input of a target flow rate for the fluid to the user interface 18. The modular plural component platform 10 may also have a preset target flow rate such that a user input is not required. The target flow rate is provided to the PID controller 80 along with a measured flow rate from the feedback meter module 84 and/or from the HAL 22. The PID controller 80 is configured to determine what adjustments, if any, are necessary to achieve the target flow rate. The PID controller 80 provides the adjustment to the dispenser module 162, which is configured to control the flow rate at the dispenser 164. The dispenser module 162 is configured to output a control value to the HAL 22 indicative of the required adjustment determined by the PID controller 80. The HAL 22 may convert the control value to an abstract value and output a signal indicative of the abstract value to the dispenser 164. In response, the dispenser 164 is configured to adjust the flow rate as determined by the PID controller 80. The meter 100 may then measure a new, adjusted flow rate, provide the adjust flow rate to the HAL 22, and the process is iteratively repeated until the target flow rate is achieved.

Additionally, while the illustrated embodiment of the modular plural component platform 10 includes various modules and components configured to control the flow rate of a single fluid, the modular plural component platform 10 may also include modules and components configured to measure and control other parameters. For example, the modular plural component platform 10 may be configured to control parameters including, but not limited to, a fluid density, a fluid temperature, and a fluid spray pattern.

Figure 7:
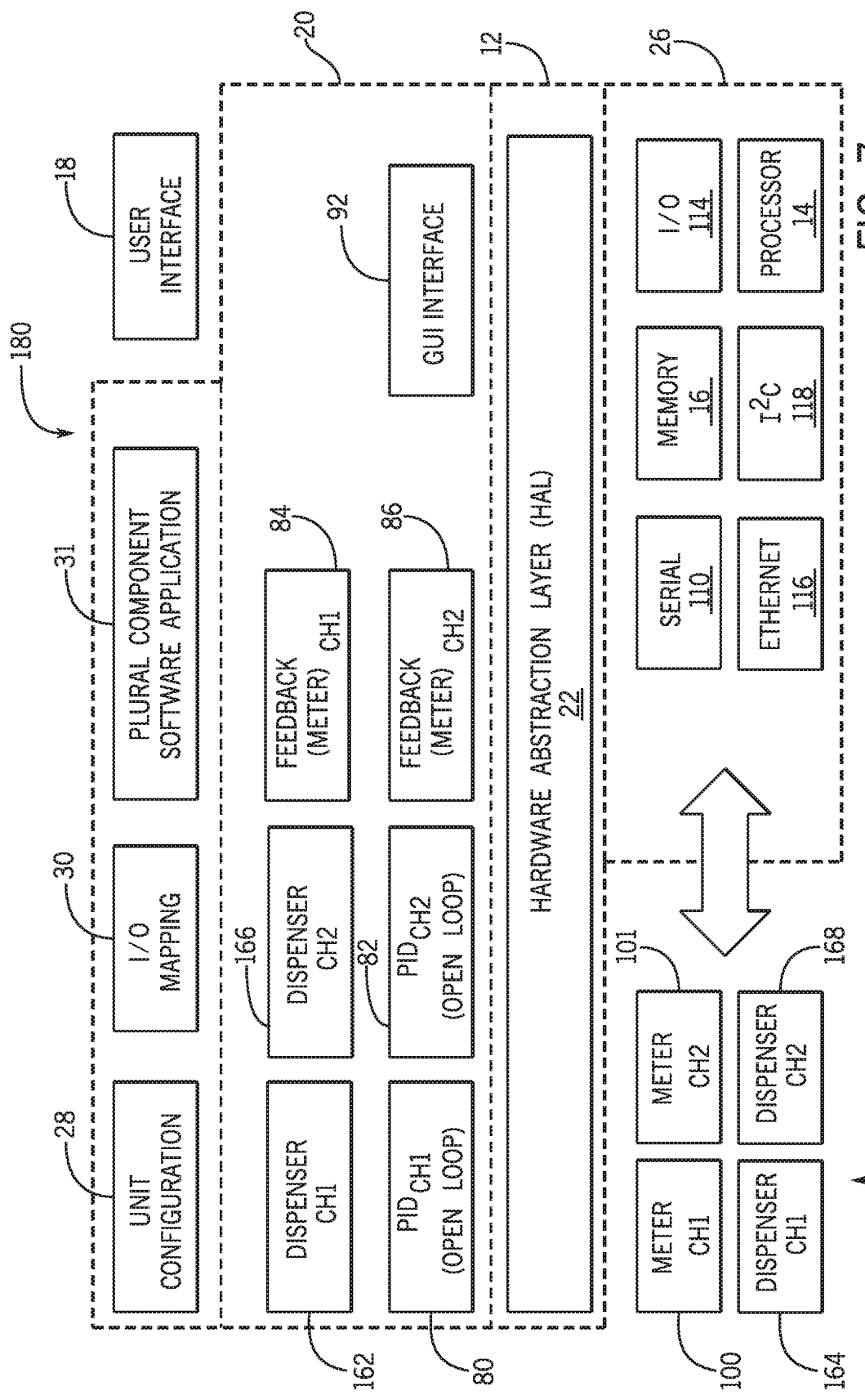

FIG. 7 is a block diagram 180 of an embodiment of the modular plural component platform 10 of FIG. 1. The embodiment shown in the block diagram 180 depicts a unit configuration with two components (i.e., a unit configuration for an application dispensing two fluids). Accordingly, the modular plural component platform 10 is reconfigurable to control two components. As illustrated, the modular plural component platform 10 for two components includes a common control system 12, a user interface 18, and fluid hardware 24. Because the block diagram 180 is configured for two components, the modular plural component platform 10 includes two channels (channel one and channel two). However, in some embodiments, a modular plural component platform for two components may include more or less than two channels.

Similar to the dispensing operation of the embodiment of the modular plural component platform 10 of the block diagram 160 of FIG. 6, the embodiment of the modular plural component platform 10 of the block diagram 180 of FIG. 7 is also configured to measure and/or control a flow rate. However, the illustrated embodiment is configured to measure and/or control a flow rate for two different fluids. For example, channel one may be connected to components of the fluid hardware 24 (i.e., meter 100 and dispenser 164) and software modules (i.e., PID controller 80, feedback meter module 84, and dispenser module 162) configured to measure and control the flow rate for a first fluid. Channel two may be connected to components of the fluid hardware 24 (i.e., meter 101 and dispenser 168) and software modules (i.e., PID controller 82, feedback meter module 86, and dispenser module 166) configured to measure and control the flow rate for a second fluid. Indeed, each fluid may be measured and controlled via separate channels.

Additionally, the two fluids of the illustrated embodiment may be measured and controlled via a single input or via multiple inputs to the user interface 18. For example, a user may provide an input to the user interface 18 indicative of a target composition of a mixture of the first fluid and the second fluid. The software modules 20 and fluid hardware 24 corresponding to each of the first fluid and the second fluid may then measure and control various parameters (e.g., a flow rate, density, temperature) of the first fluid and the second fluid to achieve the target composition. As such, the modular plural component platform 10 may achieve a mixing ratio of two components ranging from 1:1 to 1:100. In some embodiments, the first fluid and the second fluid may be dispensed as separate fluids (e.g., the first fluid may be dispensed by a first channel of a spray gun, and the second fluid may be dispensed by a second channel of the spray gun).

In certain embodiments, the modular plural component platform 10 of FIGS. 6 and/or 7 may include a PLC having a discrete I/O interface and/or a network I/O interface. For example, a discrete I/O interface of the modular plural component platform 10 of FIG. 7 may receive a first signal indicative of a first ID of the first component connected via channel one and may receive a second signal indicative of a second ID of the second component connected via channel two. Based on the received signals indicative of the first ID and the second ID, the modular plural component platform 10 may load corresponding software modules 20 as described above.

Figure 8:
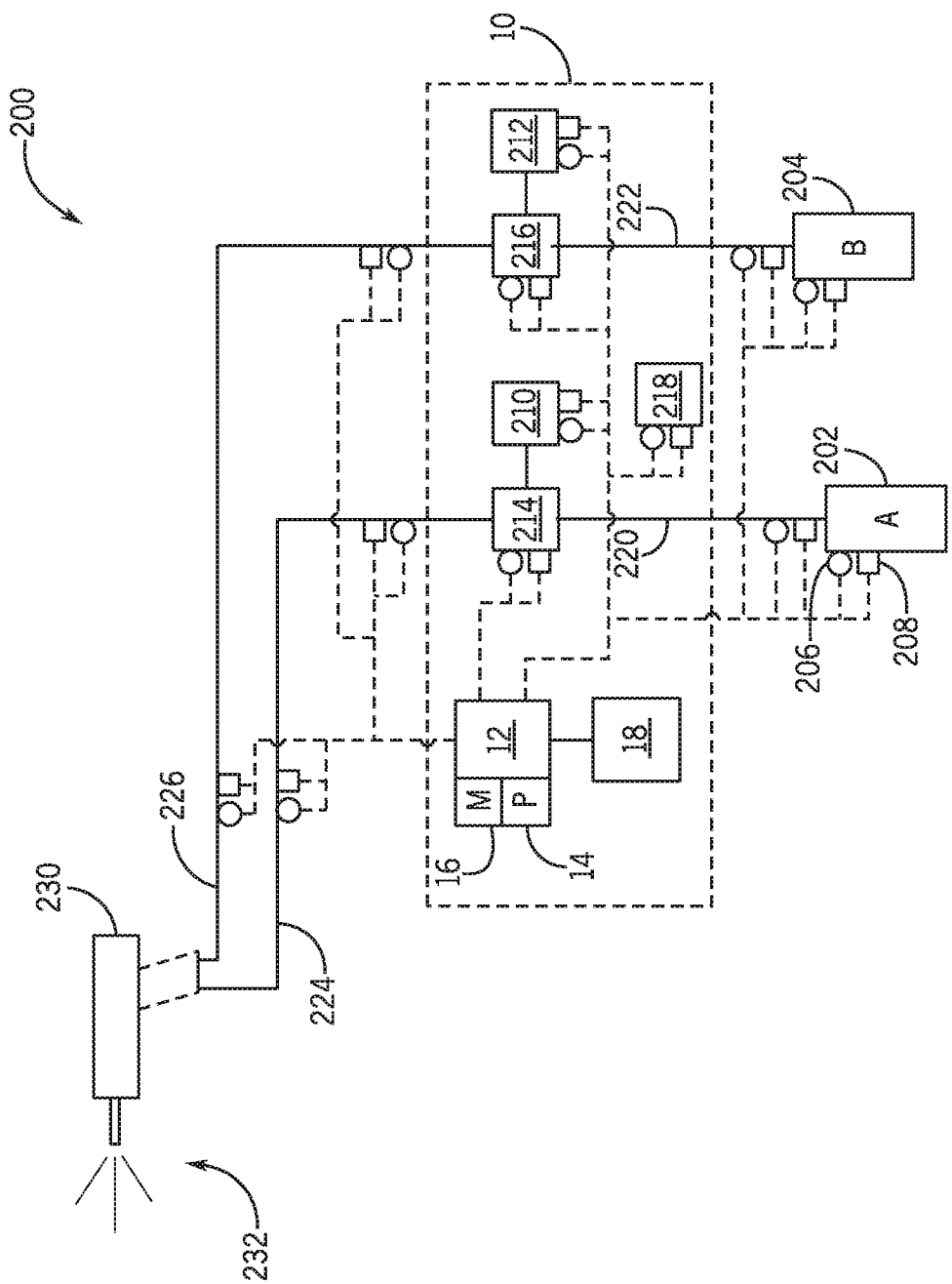
FIG. 8 is a schematic diagram of an embodiment of the modular plural component platform of FIG. 1 in a plural component mixing and dispensing application, in accordance with aspects of the present disclosure.

FIG. 8 is a schematic diagram of an embodiment of the modular plural component platform 10 of FIG. 1 in a fluid mixing and dispensing application. In the illustrated embodiment, the fluid mixing and dispensing application is a spray application system 200 that may include one or more fluid pumps 214, 216. The pumps 214 and 216 may include a component of the fluid hardware described herein. For example, the pumps 214 and 216 may include the dispensers 164 and 168 of FIG. 7. The spray application system 200 may be suitable for mixing and dispensing a variety of chemicals, such as chemicals used in applying spray foam insulation. In the depicted embodiment, chemical compounds A and B may be stored in tanks 202 and 204, respectively. The tanks 202 and 204 may be fluidly coupled to the pumps 214 and 216 via conduits or hoses 220 and 222. It is to be understood that while the depicted embodiment for the spray application system 200 shows two compounds used for mixing and spraying, other embodiments may use a single compound or 3, 4, 5, 6, 7, 8 or more compounds. The pumps 214 and 216 may be independently controlled.

During operations of the spray application system 200, the pumps 214, 216 may be mechanically powered by motors 210 and 212, respectively. In a preferred embodiment, the motors may be electric motors. However, the motors may be internal combustion engines (e.g., diesel engines), pneumatic motors, or a combination thereof.

Motor controllers of the common control system 12 may provide for motor start/stop, loading, and control based on signals transmitted, for example, from the processor 14. The motor 210 may be of the same type or of a different type from the motor 212. Likewise, the pump 214 may be of the same type or of different type from the pump 216. Indeed, the techniques described herein may be used with multiple pumps 214, 216, and multiple motors 210, 212, which may be of different types.

The pumps 214, 216 provide for hydrodynamic forces suitable for moving the compounds A, B into a spray gun system 230. More specifically, compound A may traverse the pump 214 through conduit 220 and then through a heated conduit 224 into the spray gun system 230. Likewise, compound B may traverse pump 216 through conduit 222 and then through a heated conduit 226 into the spray gun system 230. To heat the heated conduits 224, 226, a heating system 218 may be provided. The heating system 218 may provide for thermal energy, such as a heated fluid, suitable for pre-heating the compounds A and B before mixing and spraying and for heating the compounds A and B during mixing and spraying. In some embodiments, the modular plural component platform 10 may include additional or other components of fluid hardware (e.g., in addition to the pumps 214, 216, the tanks 202, 204, and the motors 210, 212). For example, the fluid hardware may include the fluid hardware 24 of FIG. 3.

The spray gun system 230 may include a mixing chamber to mix the compounds A and B. For spray foam insulation applications, the compound A may include isocyanates while the compound B may include polyols, flame retardants, blowing agents, amine or metal catalysts, surfactants, and other chemicals. When mixed, an exothermic chemical reaction occurs and a foam 232 is sprayed onto a target. The foam then provides for insulative properties at various thermal resistance (i.e., R-values) based on the chemicals found in the compounds A and B.

Control for the spray application system 200 may be provided by the common control system 12. The common control system 12 may include an industrial controller, and thus include the processor 14 and the memory 16 described herein. The memory 16 may further include computer programs or instructions executable by the processor 14 and suitable for detecting pump 214, 216 slip and for providing ratio control actions to continue providing as a target ratio (e.g., 1:1) for compounds A and B in the presence of slip, as further described below.

The common control system 12 may be communicatively coupled to one or more sensors 206 and operatively coupled to one or more actuators 208. The sensors 206 may include pressure sensors, flow sensors, temperature sensors, chemical composition sensors, speed (e.g., rotary speed, linear speed) sensors, electric measurement sensors (e.g., voltage, amperage, resistance, capacitance, inductance), level (e.g., fluid level) sensors, limit switches, and so on. The actuators 208 may include valves, actuatable switches (e.g., solenoids), positioners, heating elements, and so on.

A user or users may interface with the common control system 12 via a user interface 18, which may include touchscreens, displays, keyboards, mice, augmented reality/ virtual reality systems, as well as tablets, smartphones, notebooks, and so on. A user may input target pressures, flow rates, temperatures, ratio between compound A and compound B (e.g., 1:1), alarm thresholds (e.g., threshold fluid levels of compound A, B in tanks 202, 204), and so on. The user may then spray via the spray gun system 230, and the common control system 12 may use the processor 14 to execute one or more programs stored in the memory 16 suitable for sensing conditions via the sensors 206 and for adjusting various parameters of the system 200 via the actuators 208 based on the user inputs. The user interface 18 may then display several of the sensed conditions as well as the adjusted parameters. Certain components of the spray application system 200 may be included in or interface with the modular plural component platform 10. Components of the modular plural component platform 10 may be configured to "proportion" or deliver the compounds A, B at a specified ratio (e.g., 1:1) to achieve the spray 232. In this manner, the user(s) may mix and spray chemicals, such as compounds A and B, to provide for certain coatings, such as insulative spray foam.

As may be appreciated, the current systems and techniques provide significant enhancements to fluid mixing and dispensing systems. For example, the systems and techniques described herein enable plural component platforms of fluid mixing and dispensing systems to be reconfigured based upon a given configuration of component hardware. Software modules of the plural component platforms may be interchangeable such that modules may be installed and/or uninstalled to the common control system to match the component hardware for a particular configuration. A modular plural component platform may automatically detect the particular unit configuration and load software modules corresponding to fluid hardware of the particular unit configuration. As such, a common control system of a modular plural component platform may be used for a variety of fluid mixing and dispensing operations that include varying configurations of component hardware.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method, comprising:
   receiving, via a processor, a unit configuration for a fluid mixing and dispensing system, wherein the unit configuration comprises one or more fluid hardware components, wherein the fluid hardware components are configured to provide a coating;
   determining one or more software modules corresponding to the one or more fluid hardware components, wherein the software modules include a proportional-integral-derivative controller and a motor controller; and
   configuring a modular plural component platform by loading the one or more software modules corresponding to the one or more fluid hardware components, wherein the modular plural component platform comprises channels that reconfigure automatically based on connection to the fluid hardware components, wherein the one or more software modules comprise a flow meter module, a user interface module, or a combination thereof, and wherein the coating is a sprayed paint.

2. The method of claim 1, wherein the modular plural component platform comprises the one or more software modules and a hardware abstraction layer (HAL).

3. The method of claim 2, comprising the HAL abstractly representing one or more control values received from the one or more software modules, determining one or more measured values to be provided to the one or more software modules, or a combination thereof, wherein the one or more measured values based on one or more fluid hardware values received from the one or more components of fluid hardware.

4. The method of claim 1, wherein the one or more fluid hardware components comprise a flow meter, a motor, a pump, or a combination thereof.

5. The method of claim 1, comprising automatically determining the unit configuration based on the one or more fluid hardware components.

6. The method of claim 1, comprising determining the unit configuration based on an input from a user interface.

7. The method of claim 6, wherein the user interface displays one or more options for the unit configuration via a plural component software application.

8. The method of claim 1, comprising controlling the mixing and delivery of one or more fluids based on one or more control inputs.

9. A plural component fluid delivery system, comprising:
a user interface;
one or more fluid hardware components, wherein the fluid hardware components are configured to provide a coating; and
a modular plural component platform comprising a controller and a hardware abstraction layer, wherein the controller comprises a processor and a memory, and wherein the controller is configured to:
receive a unit configuration comprising the one or more fluid hardware components;
determine one or more software modules, wherein the software modules include a proportional-integral-derivative controller and a motor controller, corresponding to the one or more fluid hardware components; and
configure the modular plural component platform by loading the one or more software modules corresponding to the one or more fluid hardware components, wherein the modular plural component platform comprises channels that reconfigure automatically based on connection to the fluid hardware components, wherein the one or more software modules comprises a flow meter module, a user interface module, or a combination thereof, and wherein the coating is a sprayed paint.

10. The plural component fluid delivery system of claim 9, wherein the one or more fluid hardware components comprises a flow meter, a motor, a pump, or a combination thereof.

11. The plural component fluid delivery system of claim 10, wherein a software module of the one or more software modules comprises a controller module, and wherein the controller module is configured to iteratively determine adjustments to be made to the flow meter, the motor, the pump, or a combination thereof.

12. The plural component fluid delivery system of claim 9, wherein each software module of the one or more software modules is in communication with a respective fluid hardware component of the one or more fluid hardware components via a separate channel.

13. The plural component fluid delivery system of claim 12, wherein the unit configuration comprises a plurality of channels mapped to the one or more software modules and to the one or more fluid hardware components.

14. One or more tangible, non-transitory, machine-readable media comprising instructions configured to cause a processor to:
receive a unit configuration for a plural component fluid delivery system, wherein the unit configuration comprises the one or more fluid hardware components, wherein the fluid hardware components are configured to provide a coating;
determine one or more software modules, wherein the software modules include a proportional-integral-derivative controller and a motor controller, corresponding to the unit configuration; and
configure the plural component fluid delivery system by loading the one or more software modules corresponding to the unit configuration, wherein the plural component fluid delivery system comprises channels that reconfigure automatically based on connection to the fluid hardware components, wherein the one or more software modules comprises a flow meter module, a user interface module, or a combination thereof, and wherein the coating is a sprayed paint.

15. The one or more tangible, non-transitory, machine-readable media of claim 14, wherein the one or more fluid hardware components comprises a flow meter, a motor, a pump, or a combination thereof.

16. The one or more tangible, non-transitory, machine-readable media of claim 14, wherein the instructions are configured to cause the processor to install the one or more software modules corresponding to the unit configuration and uninstall other software modules.

17. The one or more tangible, non-transitory, machine-readable media of claim 14, wherein the plural component fluid delivery system is configured to enable mixing and dispensing of two fluids.

* * * * *